No. 686,689.  
Patented Nov. 12, 1901.
H. ESCHWEGE.
PROCESS OF MAKING CONCENTRATED EXTRACT OF COFFEE.
(Application filed Dec. 11, 1899.)
(No Model.)
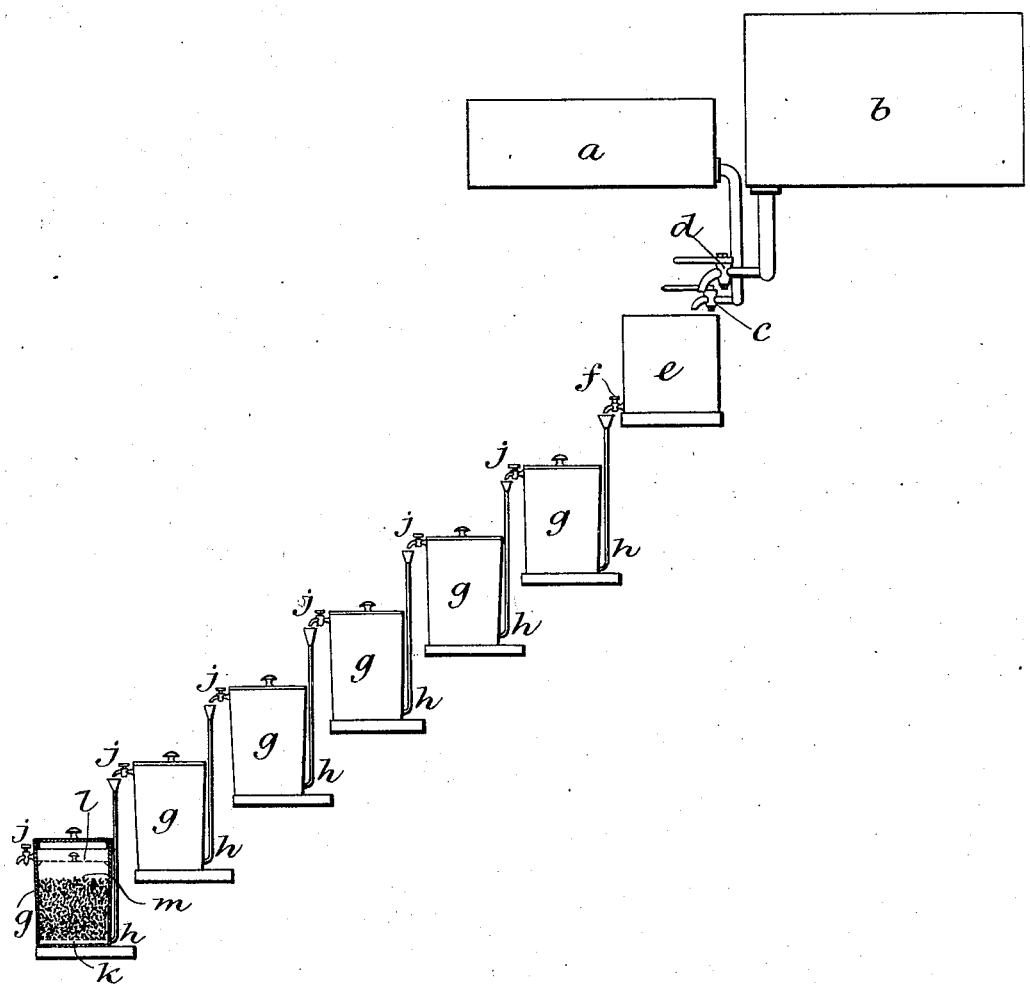

UNITED STATES PATENT OFFICE.

HERMANN ESCHWEGE, OF FOREST HILL, ENGLAND.

PROCESS OF MAKING CONCENTRATED EXTRACT OF COFFEE.

SPECIFICATION forming part of Letters Patent No. 686,689, dated November 12, 1901.

Application filed December 11, 1899. Serial No. 739,960. (No specimens.)

*To all whom it may concern:*

Be it known that I, HERMANN ESCHWEGE, manufacturer, a subject of the Queen of Great Britain, residing at Sunnyside, Mayow road, Forest Hill, in the county of Kent, England, have invented certain new and useful Improvements in the Manufacture of Extract of Coffee, of which the following is a specification.
The object of my invention is to obtain a concentrated extract of coffee without evaporation and without impairing its flavor.

Heretofore concentrated extract of coffee has usually been obtained by evaporating an infusion made with boiling water. By this means, however, the flavor of the coffee is impaired and no very satisfactory result has been obtained. It has also been proposed to obtain a liquid extract of coffee by submitting ground coffee in a series of hermetically-closed vessels to the action of boiling water caused to pass under pressure from vessel to vessel throughout the series.

I have discovered that a superior extract of coffee can be made without the loss of caffein or the presence of aromatic oils by passing water at a temperature considerably below the boiling-point successively through a series of masses of roasted coffee and that such concentrated extract need not be evaporated, and hence the extract is allowed to retain the caffein, which is volatile and ordinarily lost in evaporation.

The accompanying drawing is a diagram side elevation, partly in section, of the apparatus which I employ.

$a$ is a hot-water tank, and $b$ a cold-water tank, provided with cocks $c$ and $d$, delivering into a mixing-tank $e$. The temperature of the water in the tank $e$ should be about 100° Fahrenheit, or below.

$f$ is a cock by which water is delivered from the mixing-tank $e$ into the top of a series of similar vessels $g$, the lower one of which is shown in section. Each of these vessels is provided with an inlet-pipe $h$ and an outlet-pipe $j$. Preferably the inlet is at the bottom and the outlet at the top, as shown. $k$ and $l$ are perforated diaphragms, and $m$ is the ground roasted coffee placed between them.

The vessels $g$ are arranged in series, the outlet of one being connected to the inlet of the next, and each vessel is at a lower level than the preceding one, so that the flow from vessel to vessel takes place by gravitation.

The water introduced into the first vessel $g$ passes through the ground coffee in it and flows into the second vessel, and so on to the last. Each time the coffee in the first vessel becomes exhausted the vessel is removed (the second vessel then becoming the first) and another vessel containing fresh coffee is added at the end of the series. In this way the process is carried on continuously, the coffee in the first vessel being always the most nearly exhausted and that in the last the least.

The concentrated extract obtained by my process differs from all other concentrated extracts with which I am acquainted by the presence of a much larger proportion of caffein and the almost entire absence of aromatic oil. It is the caffein which makes the extract when diluted so closely resemble an ordinary infusion of coffee as prepared by the usual methods. It is the presence of the aromatic oils which renders other concentrated extracts of coffee so inferior to ordinary infusions and so much more unwholesome. Caffein is very volatile and is driven off by any long exposure to a high temperature, but it is not volatilized in my process. The aromatic oils can only be extracted by a long exposure to a high temperature, and are therefore not extracted in my process.

I claim as my invention—

1. The process herein described of making concentrated extract of coffee, which consists in passing water at a temperature considerably below the boiling-point successively through a series of masses of coffee.

2. The process herein described of making concentrated extract of coffee, which consists in passing water at a temperature considerably below the boiling-point successively through a series of masses of coffee until the caffein is extracted, while the aromatic oils are left behind.

3. The process herein described of making concentrated extract of coffee, which consists in passing water at a temperature considerably below the boiling-point, i. e., below 100° Fahrenheit, successively through a series of masses of ground coffee, whereby the caffein is extracted and held by the water, while the volatile oils are left behind.

4. The process herein described of making concentrated extract of coffee, rich in caffein, and practically free from aromatic oil, which consists in passing successively through a series of masses of coffee, water at a temperature considerably below the boiling-point, but of such degree as to absorb the caffein, without evaporating it, and to leave the aromatic oils behind.

HERMANN ESCHWEGE.

Witnesses:
T. WATSON WALKER,
J. PHILLIPS CRAWLEY.